US012770963B2

(12) United States Patent
Wang et al.

(10) Patent No.: US 12,770,963 B2
(45) Date of Patent: Oct. 20, 2026

(54) SEALING ASSEMBLY AND LITHIUM ION BATTERY

(71) Applicant: EVE ENERGY CO., LTD., Guangdong (CN)

(72) Inventors: Xianwen Wang, Guangdong (CN); Dingding Yuan, Guangdong (CN); Zhengzhong Lv, Guangdong (CN); Zhongzhi Yuan, Guangdong (CN); Fei Sun, Guangdong (CN); Jincheng Liu, Guangdong (CN)

(73) Assignee: EVE ENERGY CO., LTD., Guangdong (CN)

( * ) Notice: Subject to any disclaimer, the term of this patent is extended or adjusted under 35 U.S.C. 154(b) by 1082 days.

(21) Appl. No.: 17/772,746

(22) PCT Filed: Dec. 17, 2019

(86) PCT No.: PCT/CN2019/126041
§ 371 (c)(1),
(2) Date: Apr. 28, 2022

(87) PCT Pub. No.: WO2021/082218
PCT Pub. Date: May 6, 2021

(65) Prior Publication Data

US 2022/0359936 A1 Nov. 10, 2022

(30) Foreign Application Priority Data

Oct. 28, 2019 (CN) ......................... 201911030912.2

(51) Int. Cl.
*H01M 50/15* (2021.01)
*H01M 10/0525* (2010.01)
*H01M 50/186* (2021.01)

(52) U.S. Cl.
CPC ......... *H01M 50/15* (2021.01); *H01M 50/186* (2021.01); *H01M 10/0525* (2013.01)

(58) Field of Classification Search
None
See application file for complete search history.

(56) References Cited

U.S. PATENT DOCUMENTS 3,109,127 A * 10/1963 Guetersloh ............ H01G 4/224 174/559
2006/0141355 A1* 6/2006 Kang .................... H01M 50/55 429/174

(Continued)

FOREIGN PATENT DOCUMENTS

CN 101752611 A 6/2010
CN 103378343 A 10/2013

(Continued)

OTHER PUBLICATIONS

Wang (CN 208256740U) translation from Google Patents (Year: 2018).*

(Continued)

*Primary Examiner* — Jonathan G Leong
*Assistant Examiner* — Claire A Rutiser
(74) *Attorney, Agent, or Firm* — HUNTON ANDREWS KURTH LLP

(57) ABSTRACT

Provided sealing assembly and lithium ion battery. The sealing assembly includes a cover plate, conductors, and sealing mechanisms. The cover plate provided with fixing members for fixing electrode posts. The fixing members and the cover plate integrally stamped and formed. Each fixing member includes an enclosure plate and a limiting plate. The cover plate further provided with mounting holes for installing the electrode posts. Each enclosure plate located on first side surface of the cover plate and surrounds a periphery of a respective mounting hole. The limiting plate formed by (Continued)

extending an end of respective enclosure plate facing away from the cover plate to center of a respective mounting hole. Each conductor connected between respective fixing member and respective electrode post through injection-molded. The sealing mechanism fixed on second side surface of the cover plate and configured to seal gaps between the cover plate and the electrode posts.

9 Claims, 4 Drawing Sheets

(56) References Cited

U.S. PATENT DOCUMENTS

| | | | | |
|---|---|---|---|---|
| 2010/0273046 | A1* | 10/2010 | Kuo | H01M 50/3425 156/308.2 |
| 2013/0004834 | A1 | 1/2013 | Jiang | |
| 2015/0318526 | A1* | 11/2015 | Mune | H01G 11/78 429/56 |

FOREIGN PATENT DOCUMENTS

| | | | |
|---|---|---|---|
| CN | 205657096 | U | 10/2016 |
| CN | 108365138 | A | 8/2018 |
| CN | 108847459 | A | 11/2018 |
| CN | 208173638 | U | 11/2018 |
| CN | 208256740 | U | 12/2018 |
| CN | 208873779 | U | 5/2019 |
| CN | 110233215 | A | 9/2019 |
| CN | 110246993 | A | 9/2019 |
| JP | 2003272573 | A | 9/2003 |
| JP | 2016081873 | A | 5/2016 |

OTHER PUBLICATIONS

Extended European Search Report dated Sep. 16, 2024 issued in EP 19950443.2 .

First Search Of CN 2019110309122 filed on Oct. 28, 2019.

International Search Report dated Jun. 29, 2020 issued in PCT/CN2019/126041 dated Jun. 29, 2020.

The Second Office Action dated Mar. 31, 2021 issued in CN 201911030912.2.

* cited by examiner

SEALING ASSEMBLY AND LITHIUM ION BATTERY

CROSS-REFERENCE TO RELATED APPLICATION(S)

This is a national stage application filed under 37 U.S.C. 371 based on International Patent Application No. PCT/CN2019/126041, filed Dec. 17, 2019, which claims priority to Chinese Patent Application No. 201911030912.2 filed with the China National Intellectual Property Administration (CNIPA) on Oct. 28, 2019, the disclosures of which are incorporated herein by reference in their entireties.

TECHNICAL FIELD

The present application relates to the field of battery technologies, for example, to a sealing assembly and a lithium ion battery.

BACKGROUND

Lithium ion batteries have characteristics of high power density, fast charge and discharge, and long service life. The lithium ion batteries have become the mainstream of the battery energy market and are widely used in automotive power devices, energy storage devices, power tools, electronic appliances, emergency equipment, the military field and the like. With the development of equipment, people have put forward higher requirements for the performance of the lithium ion batteries, especially the reliability, safety and cost performance of the lithium ion batteries. An existing lithium ion battery includes seals such as a cover plate, a positive electrode post assembly and a negative electrode post assembly protruding from the cover plate, an explosion-proof pressure relief valve assembly, an insulation protecting member, a liquid injection hole sealing member, and the like. A positive electrode post of the positive electrode post assembly and a negative electrode post of the negative electrode post assembly are generally manufactured through machining, or relatively thick material are formed via cold heading and extruding through equipment and dies and then fine blanked. Moreover, the negative electrode post is a composite structure and needs welding, mechanical finishing and other processes when manufactured, which causes more material waste, a low operation efficiency and a high cost. In addition, a positive terminal and a negative terminal on the cover plate are generally fixed by additional components, and the fixing components need to be welded to the cover plate, resulting in the cover plate composed of a large number of components, assembly procedures complicated, more material used, and cost being high.

SUMMARY

The present application provides a sealing assembly and a lithium ion battery, which have a simpler structure, a smaller number of components, fewer manufacturing steps, a lower cost, and a better sealing effect.

In a first aspect, the present application provides a sealing assembly. The sealing assembly includes a cover plate, conductors, and sealing mechanisms.

The cover plate is provided with fixing members for fixing electrode posts, the fixing members and the cover plate are integrally stamped and formed, each fixing member includes an enclosure plate and a limiting plate, the cover plate is further provided with a mounting hole for installing a respective electrode post, the enclosure plate is located on a first side surface of a respective cover plate and surrounds a periphery of a respective mounting hole, and the limiting plate is formed by extending an end of a respective enclosure plate facing away from the cover plate to a center of a respective mounting hole.

Each conductor is injection-molded and connected between a respective fixing member and a respective electrode post.

Each sealing mechanism is fixed on a second side surface of the cover plate and configured to seal a gap between the cover plate and a respective electrode post.

An injection-molded notch is provided on the limiting plate, each conductor comprises a first injection-molded body, a second injection-molded body, and a third injection-molded body, the first injection-molded body is injection-molded on a side surface of a respective fixing member farther from a center of a respective mounting hole, the third injection-molded body is injection-molded between a side surface of the respective fixing member closer to the respective mounting hole and an outer peripheral wall of a respective electrode post, the second injection-molded body is connected to the first injection-molded body and the third injection-molded body, and the second injection-molded body is partially disposed in the injection-molded notch.

An anti-rotation slot is recessed on an outer peripheral wall of each electrode post, and a respective conductor partially extends into the anti-rotation slot.

A ring of limiting portion is annularly provided and protrudes from an outer periphery of an end of each electrode post closer to the second side surface, an end of the limiting portion farther from a center of a respective electrode post is a limiting end, an end surface of the limiting end is spaced apart from a respective fixing member, and a respective conductor covers a side surface of the limiting portion closer to the first side surface and the end surface of the limiting end.

A reinforcement notch is provided on a side of the limiting portion closer to the second side surface, the reinforcement notch communicates with the end surface of the limiting end, and the conductor partially extends into the reinforcement notch.

Each sealing mechanism comprises a seal plate and a platen, a mounting slot is annularly provided and opened on the second side surface of the cover plate along the center of each mounting hole, the mounting hole penetrates a slot bottom of a respective mounting slot, the seal plate is attached to an end surface of an end of a respective electrode post closer to the second side surface, the seal plate shields a connection between a respective conductor and a respective electrode post, and the platen is fixed in a respective mounting slot.

A ring of sealing ridge is annularly provided and protrudes on a side surface of the platen facing towards the seal plate, and the sealing ridge abuts against a side surface of the seal plate farther from a respective electrode post.

A periphery of the platen is welded to a slot wall of the mounting slot, a plurality of welding slots are annularly provided and spaced apart at the slot bottom of the mounting slot, welding through holes corresponding to the plurality of welding slots are provided and opened on the platen, and solder is provided in both the welding through holes and the plurality of welding slots.

A protection hole penetrates the cover plate along a thickness direction of the cover plate, a ring of first positioning slot is annularly provided and opened on the first side surface along a central axis of the protection hole, a ring of second positioning slot is annularly provided and opened on the second side surface along a center of the protection hole, the protection hole respectively penetrates a slot bottom of the first positioning slot and a slot bottom of the second positioning slot, a protecting member is provided and installed in the first positioning slot, an exhaust hole is provided and opened on the protecting member, and a pressure relief valve is provided and installed in the second positioning slot.

In a second aspect, the present application provides a lithium ion battery. The lithium ion battery includes a battery housing and a cell disposed in the battery housing, and an upper end opening of the battery housing is sealed by the sealing assembly.

In the present application, the fixing members are integrally stamped and formed on the cover plate so that the number of components and assembly processes of the cover plate can be reduced, the machining difficulty can be reduced, and the electrode posts can be installed quickly and accurately. By providing conductors which are injection-molded, the conductors can be connected to the fixing members and the electrode posts, so as to enhance the fixing strength and provide a sealing protection layer for sealing positions where the electrode posts are disposed. The sealing mechanisms are fixed on the second side surface of the cover plate so that the second side surface of the cover plate may be sealed, thereby preventing the electrolyte of the lithium ion battery from entering gaps between the electrode posts and the cover plate.

BRIEF DESCRIPTION OF DRAWINGS

The present application is further described in detail according to the accompany drawings and embodiments.

REFERENCE LIST

- 1. cover plate, 11. fixing member, 111. enclosure plate, 112. limiting plate,
- 1121. injection-molded notch, 12. mounting hole, 13. first side surface, 14. second side surface
- 15. mounting slot, 16. protection hole, 17. first positioning slot, 18. second positioning slot, 19. liquid injection hole,
- 2. positive electrode post, 21. limiting portion, 22. reinforcement notch, 23. positioning hole,
- 3. negative electrode post,
- 4. conductor, 41. first injection-molded body, 42. second injection-molded body, 43. third injection-molded body, 44. anti-rotation injection-molded body, 45. reinforcement injection-molded body,
- 5. seal plate,
- 6. platen, 61. sealing ridge
- 7. protecting member, 71. exhaust hole
- 8. pressure relief valve,
- 9. liquid injection seal member, 91. seal body, 92. seal limiting plate
- 10. insulation protecting member, 101. insulating protecting portion

DETAILED DESCRIPTION

To make solved problems, adopted solutions and achieved effects of the present application clearer, the solution of the present application is further described in detail in conjunction with the drawings. In the description of the present application, terms “joined”, “connected” and “secured” are to be understood in a broad sense unless otherwise expressly specified and limited. For example, the term “connected” may refer to “securely connected”, “detachably connected” or “integrated”, may refer to “mechanically connected” or “electrically connected” or may refer to “connected directly”, “connected indirectly through an intermediary” or “connected inside two components” or “interaction relations between two components”. For those of ordinary skill in the art, specific meanings of the preceding terms in the present application may be understood based on specific situations.

In the present application, unless otherwise expressly specified and limited, when a first feature is described as “on” or “below” a second feature, the first feature and the second feature may be in direct contact or be in contact via another feature between the two features instead of being in direct contact. Moreover, when the first feature is described as “on”, “above”, or “over” the second feature, the first feature is right on, above, or over the second feature or the first feature is obliquely on, above, or over the second feature, or the first feature is simply at a higher level than the second feature. When the first feature is described as “under”, “below”, or “underneath” the second feature, the first feature is right under, below, or underneath the second feature or the first feature is obliquely under, below, or underneath the second feature, or the first feature is simply at a lower level than the second feature.

Figure 1:
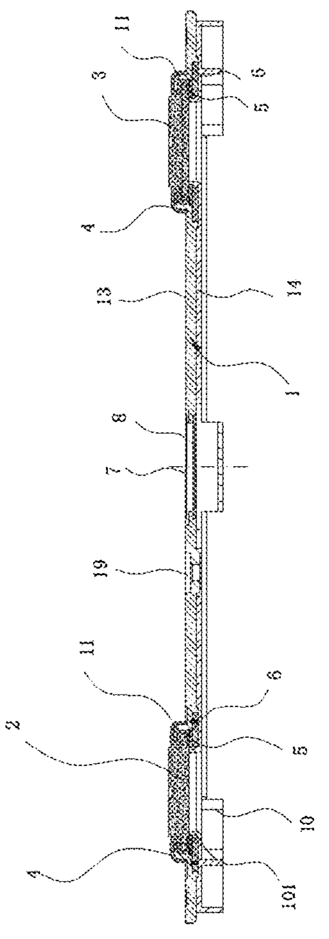
FIG. 1 is a sectional view of a sealing assembly according to an embodiment of the present application.
Figure 2:
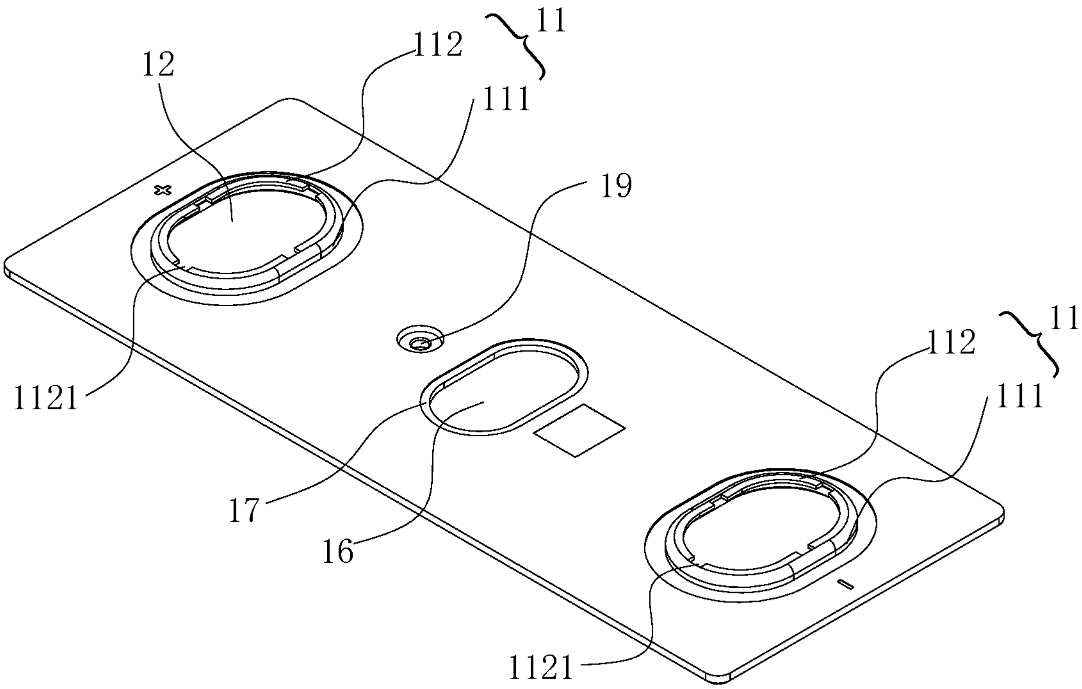
FIG. 2 is a perspective view of a cover plate according to an embodiment of the present application.
Figure 3:
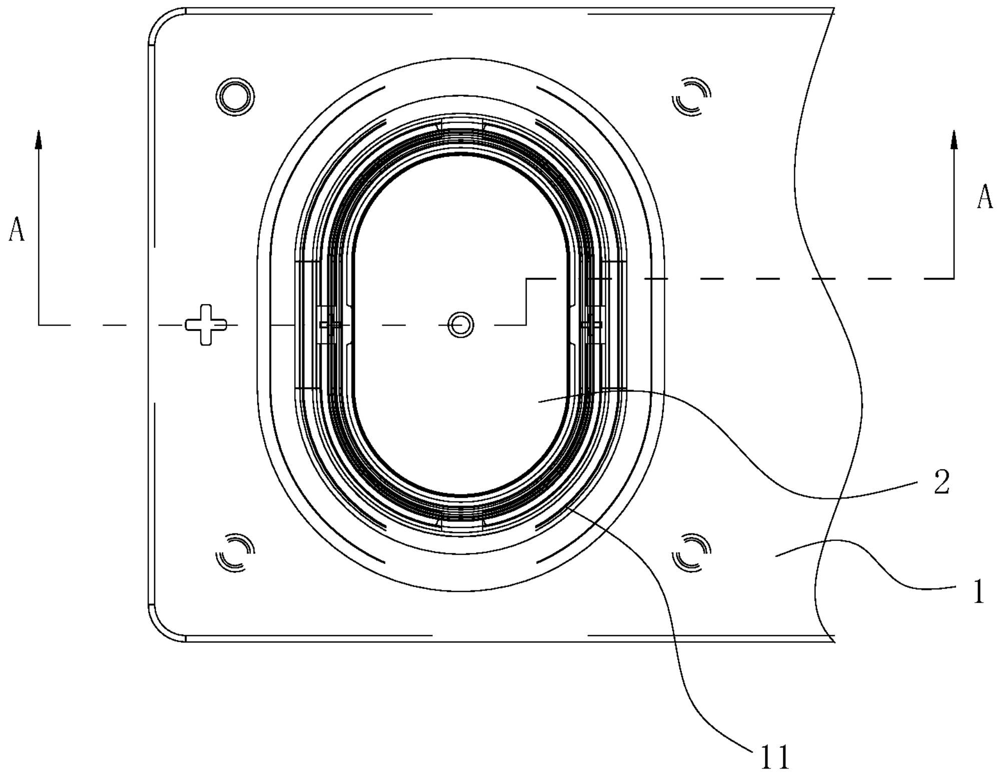
FIG. 3 is a partial top view of a sealing assembly according to an embodiment of the present application.
Figure 4:
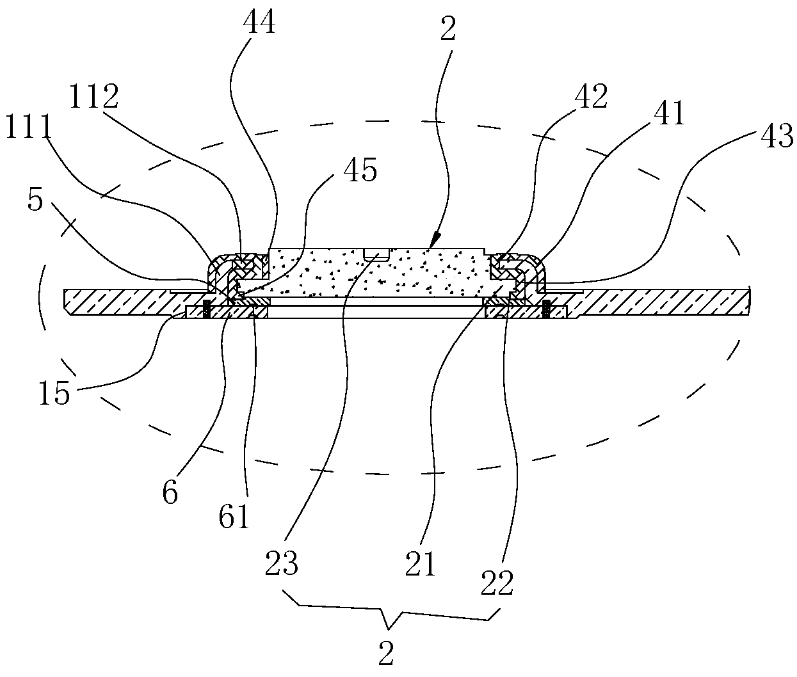
FIG. 4 is a sectional view of the sealing assembly in FIG. 3 taken along A-A.
Figure 5:
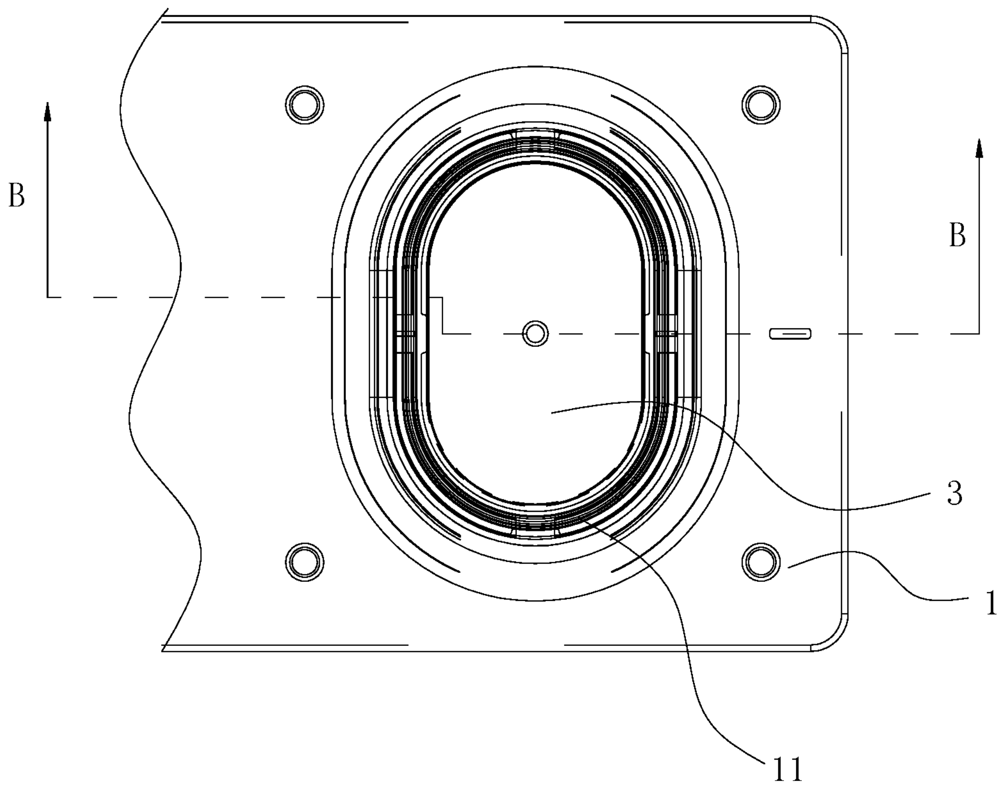
FIG. 5 is a partial top view of a sealing assembly according to an embodiment of the present application.
Figure 6:
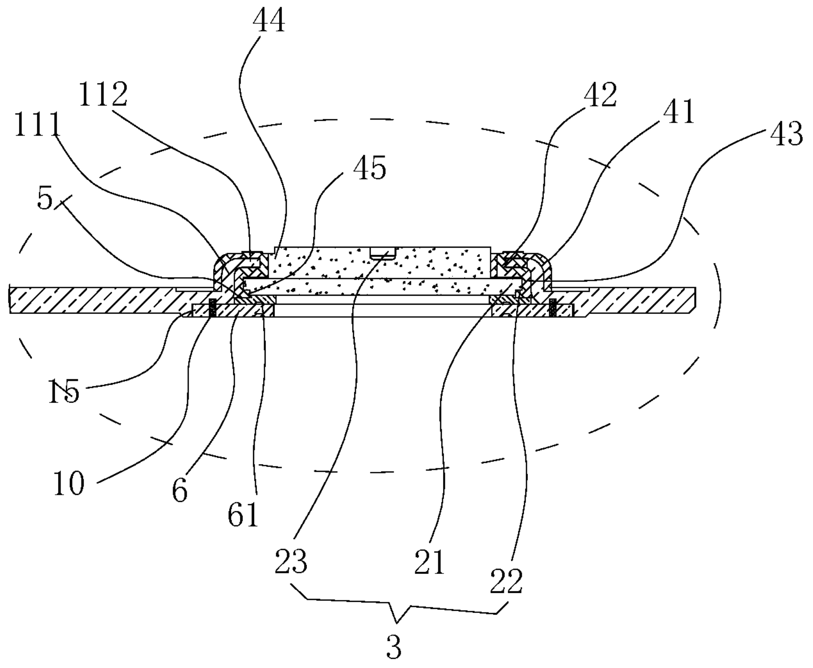
FIG. 6 is a sectional view of the sealing assembly in FIG. 5 taken along B-B.
Figure 7:
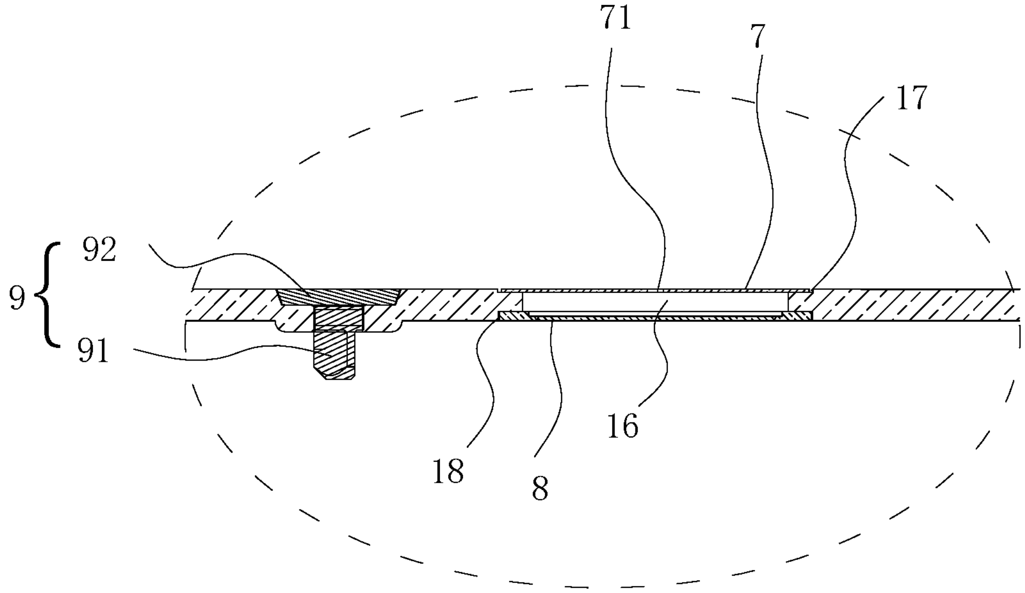
FIG. 7 is a partial enlarged view of the sealing assembly in FIG. 1.

As shown in FIGS. 1 to 7, an embodiment of the present application provides a sealing assembly. The sealing assembly includes a cover plate 1, conductors 4, and sealing mechanisms, where the cover plate 1 is provided with fixing members 11 for fixing electrode posts, the fixing members 11 and the cover plate 1 are integrally stamped and formed, each fixing member 11 includes an enclosure plate 111 and a limiting plate 112, the cover plate 1 is further provided with mounting holes 12 for installing the electrode posts, enclosure plates 111 are provided and located on a first side surface 13 of the cover plate 1 and each surrounds a periphery of a respective mounting hole 12, and the limiting plate 112 is formed by extending an end of the respective enclosure plate 111 facing away from the cover plate 1 to a center of the respective mounting hole 12; each conductor 4 is injection-molded and connected between the respective fixing member 11 and the respective electrode post; and the sealing mechanisms are fixed on a second side surface 14 of the cover plate 1 and configured to seal gaps between the cover plate 1 and the electrode posts. The fixing member 11 is integrally stamped and formed on the cover plate 1 so that the number of components and assembly processes of the cover plate 1 can be reduced, the machining difficulty is reduced, and the electrode post can be installed quickly and accurately. The conductors 4 which are injection-molded each can be connected to the respective fixing member 11 and the respective electrode post, so as to enhance the fixing strength and provide a sealing protection layer for sealing positions where the electrode posts are disposed. The sealing mechanisms each is fixed on the second side surface 14 of the cover plate 1 so that the second side surface 14 of the cover plate 1 may be sealed, thereby preventing electrolyte of a lithium ion battery from entering gaps between the electrode posts and the cover plate 1.

In the present application, the electrode post includes a positive electrode post 2 and a negative electrode post 3, mounting holes 12 corresponding to the positive electrode post 2 and the negative electrode post 3 are disposed on the cover plate 1, and the two mounting holes 12 are each provided with the fixing member 11, the conductor 4 connecting the fixing member 11 to the positive electrode post 2 or connecting the fixing member 11 to the negative electrode post 3, and the sealing mechanism.

The following is an example description of a structure at the positive electrode post 2.

An injection-molded notch 1121 is disposed on the limiting plate 112, the conductor 4 includes a first injection-molded body 41, a second injection-molded body 42, and a third injection-molded body 43, the first injection-molded body 41 is injection-molded on a side surface of the fixing member 11 farther from the center of the mounting hole 12, the third injection-molded body 43 is injection-molded between a side surface of the fixing member 11 closer to the mounting hole 12 and an outer peripheral wall of the positive electrode post 2, the second injection-molded body 42 is connected to the first injection-molded body 41 and the third injection-molded body 43, and the second injection-molded body 42 is partially disposed in the injection-molded notch 1121. When the conductor 4 is injection-molded, the conductor 4 is wrapped around inner and outer sides of the entire fixing member 11, thereby improving the strength of the conductor 4 connecting the positive electrode post 2 to the fixing member 11. The injection-molded notch 1121 is provided so as to accelerate the flow of the conductor 4. Further, the conductor 4 is introduced between the outer peripheral wall of the positive electrode post 2 and the fixing member 11 so that not only the fixing stability of the positive electrode post 2 can be improved, but also a gap between the outer peripheral wall of the positive electrode post 2 and an inner side wall of the fixing member 11 can be completely sealed, thereby improving a sealing effect.

Multiple injection-molded notches 1121 are provided on the limiting plate 112, and the multiple injection-molded notches 1121 are symmetrically arranged along a central axis of the mounting hole 12.

The mounting hole 12 is an oval hole. Correspondingly, the enclosure plate 111 and the limiting plate 112 are both distributed in an oval shape. Four injection-molded notches 1121 are provided, where two of the four injection-molded notches 1121 are symmetrically disposed along a center of a long axis of the limiting plate 112, and the other two of the four injection-molded notches 1121 are symmetrically disposed along a center of a short axis of the limiting plate 112.

In an embodiment, an anti-rotation slot is recessed on an outer peripheral wall of the positive electrode post 2, and the conductor 4 partially extends into the anti-rotation slot to form an anti-rotation injection-molded body 44. The anti-rotation slot is disposed so that the conductor 4 is injection-molded in the anti-rotation slot, thereby enhancing a torsional force of the positive electrode post 2.

In this embodiment, two anti-rotation slots are symmetrically arranged on the outer peripheral wall of the positive electrode post 2 along a center of the positive electrode post 2.

In an embodiment, a ring of limiting portion 21 is annularly provided and protrudes from an outer periphery of an end of the positive electrode post 2 closer to the second side surface 14, an end of the limiting portion 21 farther from the center of the positive electrode post 2 is a limiting end, an end surface of the limiting end is spaced apart from the fixing member 11, and the conductor 4 covers a side surface of the limiting portion 21 closer to the first side surface 13 and the end surface of the limiting end. The limiting portion 21 is disposed and the conductor 4 covers the limiting portion 21, thereby enhancing the fixing stability of the positive electrode post 2.

In an embodiment, a side of the limiting portion 21 closer to the second side surface 14 is provided with a reinforcement notch 22, the reinforcement notch 22 communicates with the end surface of the limiting end, and the conductor 4 partially extends into the reinforcement notch 22 to form a reinforcement injection-molded body 45. The reinforcing notch 22 is disposed and the conductor 4 partially extends into the reinforcement notch 22 to form the reinforcement injection-molded body 45. In such a way, not only the fixing stability of the entire conductor 4 can be increased, but also the compressive strength of the positive electrode post 2 on the cover plate 1 can be strengthened, thereby ensuring the reliability of the sealing at this position.

In an embodiment, the sealing mechanism includes a seal plate 5 and a platen 6, a mounting slot 15 is annularly provided and opened on the second side surface 14 of the cover plate 1 along the center of the mounting hole 12, the mounting hole 12 penetrates a slot bottom of the mounting slot 15, the seal plate 5 is attached to an end surface of an end of the positive electrode post 2 closer to the second side surface 14, the seal plate 5 shields a connection between the conductor 4 and the positive electrode post 2, and the platen 6 is fixed in the mounting slot 5. The seal plate 5 is disposed so that a position between the positive electrode post 2 and the conductor 4 can be further sealed, and the fixed platen 6 may ensure that the sealing of the seal plate 5 does not fail.

A ring of sealing ridge 61 is annularly provided and protrudes on a side surface of the platen 6 facing towards the seal plate 5, and the sealing ridge 61 abuts against a side surface of the seal plate 5 farther from the positive electrode post 2. The sealing ridge 61 is disposed and the sealing ridge 61 abuts against the seal plate 5, thereby further preventing a middle of the seal plate 5 from protruding outward and ensuring the reliability of the sealing at the entire positive electrode post 2.

A periphery of the platen 6 is welded to a slot wall of the mounting slot 15, and the platen 6 is welded and fixed, to ensure that the platen 6 would not fall off or loosen at all, thereby ensuring that the sealing would not fail.

Multiple welding slots are annularly provided and spaced apart at the slot bottom of the mounting slot 15, welding through holes corresponding to the multiple welding slots are provided and opened on the platen 6, and solder 10 is provided in both the welding through holes and the multiple welding slots. The welding through holes are provided and opened at non-edge positions of the platen 6, the welding slots are provided and opened correspondingly at the slot bottom of the mounting slot 15, and the non-edge positions of the platen 6 may be welded and fixed, so as to avoid the following case: only an edge of the platen 6 is welded causing that an inner part of the platen 6 protrudes outward. In this manner, it is ensured that each position of the platen 6 can press the seal plate 5 tightly.

An insulation protecting member 11 is further disposed on the second side surface 14 of the cover plate 2, a middle of the platen 6 and a middle of the seal plate 5 are each provided with an opening, and the positive electrode post 2 and the negative electrode post 3 communicate with an inside of a housing of the lithium ion battery through the openings.

The insulation protecting member 11 is provided with an insulating protection through hole corresponding to the openings. The insulating protection through hole extends toward the positive electrode post 2 and the negative electrode post 3 to form an insulating protecting portion 101, and the insulating protecting portion 101 is closely attached to an inner wall of the openings.

In addition, a cross section of the positive electrode post 2 may be configured to be of a square, a circular, a waist-shaped, an oval or a polygonal.

Connection relationships among and specific structures of the fixing member 11, the conductor 4, the seal plate 5, the platen 6 and other components at the negative electrode post 3 are the same as those at the positive electrode post 2, and reference may be made to any of the preceding embodiments. The connection relationships among and specific structures of the fixing member 11, the conductor 4, the seal plate 5, and the platen 6 at the negative electrode post 3 will not be repeated herein.

A composite plate is integrally stamped to form the negative electrode post 3. When the negative electrode post 3 is prepared, the limiting portion 21 and the reinforcement notch 22 are also integrally stamped and formed so that welding processes of the negative electrode post 3 are saved, the machining difficulty of the negative electrode post 3 is reduced, the machining speed is improved, welding and machining operations do not need, and only a one-step stamping needs to be performed.

Similarly, a cross section of the negative electrode post 3 may be configured to be of a square, a circular, a waist-shaped, an oval or a polygonal.

In addition, positioning holes 23 are provided and opened on end surfaces of ends of the positive electrode post 2 and the negative electrode post 3 protruding from the first side surface 11 of the cover plate 1, the positioning holes 23 are disposed at centers of the positive electrode post 2 and the negative electrode post 3, and the positioning holes 23 are blind holes. The positioning holes 23 are disposed so that positions of the positive electrode post 2 and the negative electrode post 3 can be positioned when the conductor 4 is injection-molded, thereby preventing the positive electrode post 2 and the negative electrode post 3 from being displaced during injection molding.

In an embodiment, a protection hole 16 penetrates the cover plate 1 along a thickness direction of the cover plate 1, a ring of first positioning slot 17 is annularly provided and opened on the first side surface 13 along a central axis of the protection hole 16, a ring of second positioning slot 18 is annularly provided and opened on the second side surface 14 along a center of the protection hole 16, the protection hole 16 respectively penetrates a slot bottom of the first positioning slot 17 and a slot bottom of the second positioning slot 18, a protecting member 7 is installed in the first positioning slot 17, an exhaust hole 71 is provided and opened on the protecting member 7, and a pressure relief valve 8 is installed in the second positioning slot 18. The first positioning slot 17 and the second positioning slot 18 are disposed, thereby facilitating the installation and positioning of the protecting member 7 and the pressure relief valve 8.

In this embodiment, a liquid injection hole is further provided and opened on the cover plate 1 and a liquid injection seal member 9 is detachably provided at the liquid injection hole.

The liquid injection hole may be configured to be a stepped hole, and the stepped hole includes a first hole and a second hole that communicate with each other, where a diameter of the first hole is greater than a diameter of the second hole. The liquid injection seal member 9 includes a seal body 91 and a seal limiting plate 92, where the seal body 91 is screwed into the second hole, and the seal limiting plate 92 is disposed in the first hole and does not protrude from the first side surface 13 of the cover plate 1.

The sealing assembly in the present application has a simpler structure, thereby reducing investment of production equipment, effectively reducing production cost, and meeting the improved requirements of the sealing assembly of the lithium ion battery for safety, reliability and stability.

An embodiment of the present application further provides a lithium ion battery. The lithium ion battery includes a battery housing and a cell disposed in the battery housing, and an upper end opening of the battery housing is sealed by the sealing assembly according to any of the preceding embodiments.

In the description of the present application, it is to be understood that the orientation or position relationships indicated by terms "above" and the like are the orientation or position relationships shown in the drawings, merely for ease of description and simplifying operations, and these relationships do not indicate or imply that the referred device or component has a specific orientation and is constructed and operated in a specific orientation, and thus it is not to be construed as a limitation to the present application.

In the description of the specification, the description of reference terms "an embodiment" and the like means that specific features, structures, materials or characteristics described in connection with the embodiment are included in at least one embodiment or example of the present application. In the specification, the schematic representation of the preceding terms does not necessarily refer to the same embodiment.

Moreover, it is to be understood that although this specification is described in terms of the embodiments, not each embodiment includes only one independent technical solution. Such description mode of the specification is merely for the sake of clarity, and those skilled in the art should regard the specification as a whole. The technical solutions in the embodiments may also be appropriately combined to form other embodiments which will be understood by those skilled in the art.

What is claimed is:

1. A sealing assembly, comprising:

a cover plate, wherein the cover plate is provided with fixing members for fixing electrode posts, the fixing members and the cover plate are integrally stamped and formed, each of the fixing members comprises an enclosure plate and a limiting plate, the cover plate is further provided with a mounting hole for installing an electrode post of the electrode posts, the enclosure plate is located on a first side surface of the cover plate and surrounds a periphery of the mounting hole, and the limiting plate is formed by extending an end of the enclosure plate facing away from the cover plate to a center of the mounting hole;

conductors, wherein each of the conductors is injection-molded and connected between a fixing member of the fixing members and the electrode post; and wherein each of the conductors forms a continuous conductive path between the fixing member and the electrode post;

sealing mechanisms, wherein each of the sealing mechanisms is fixed on a second side surface of the cover plate and configured to seal a gap between the cover plate and the electrode post;

wherein an injection-molded notch is provided on the limiting plate, each of the conductors comprises a first injection-molded body, a second injection-molded body, and a third injection-molded body, the first injection-molded body is injection-molded on a side surface of the fixing member facing away from a center of the mounting hole, the third injection-molded body is injection-molded between a side surface of the fixing member facing the mounting hole and an outer peripheral wall of the electrode post, the second injection-molded body extends between and integrally connects the first injection-molded body and the third injection-molded body, and the second injection-molded body is at least partially received within the injection-molded notch to mechanically lock the conductor to the limiting plate and to form an embedded connection between the first injection-molded body and the third injection-molded body via the injection-molded notch, thereby improving retention of the conductor relative to the fixing member.

2. The sealing assembly of claim 1, wherein an anti-rotation slot is recessed on an outer peripheral wall of each of the electrode posts, and the conductor partially extends into the anti-rotation slot.

3. The sealing assembly of claim 1, wherein an annular limiting portion is provided, and the limiting portion protrudes from an outer periphery of an end of each of the electrode posts facing the second side surface, an end of the limiting portion facing away from a center of the electrode post is a limiting end, an end surface of the limiting end is spaced apart from the fixing member, and the conductor covers a side surface of the limiting portion facing the first side surface and the end surface of the limiting end.

4. The sealing assembly of claim 3, wherein a reinforcement notch is provided on a side of the limiting portion closer to the second side surface, the reinforcement notch communicates with the end surface of the limiting end, and the conductor partially extends into the reinforcement notch.

5. The sealing assembly of claim 1, wherein each of the sealing mechanisms comprises a seal plate and a platen, a mounting slot is annularly provided and opened on the second side surface of the cover plate along a center of the mounting hole, the mounting hole penetrates a slot bottom of the mounting slot, the seal plate is attached to an end surface of an end of the electrode post facing the second side surface, the seal plate shields a connection between the conductor and the electrode post, and the platen is fixed in the mounting slot.

6. The sealing assembly of claim 5, wherein a ring of sealing ridge is annularly provided and protrudes on a side surface of the platen facing towards the seal plate, and the sealing ridge abuts against a side surface of the seal plate facing away from the electrode post.

7. The sealing assembly of claim 5, wherein a periphery of the platen is welded to a slot wall of the mounting slot, a plurality of welding slots are annularly provided and spaced apart at the slot bottom of the mounting slot, welding through holes corresponding to the plurality of welding slots are provided and opened on the platen, and solder is provided in both the welding through holes and the plurality of welding slots.

8. The sealing assembly of claim 1, wherein a protection hole penetrates the cover plate along a thickness direction of the cover plate, a ring of first positioning slot is annularly provided and opened on the first side surface along a central axis of the protection hole, a ring of second positioning slot is annularly provided and opened on the second side surface along a center of the protection hole, the protection hole sequentially penetrates a slot bottom of the first positioning slot and a slot bottom of the second positioning slot, a protecting member is provided and installed in the first positioning slot, an exhaust hole is provided and opened on the protecting member, and a pressure relief valve is provided and installed in the second positioning slot.

9. A lithium ion battery, comprising a battery housing and a cell disposed in the battery housing, wherein an upper end opening of the battery housing is sealed by the sealing assembly of claim 1.

* * * * *